United States Patent
Cizek

(10) Patent No.: US 7,177,498 B2
(45) Date of Patent: Feb. 13, 2007

(54) TWO-BY-TWO OPTICAL ROUTING ELEMENT USING TWO-POSITION MEMS MIRRORS

(75) Inventor: Nicholas Charles Cizek, Superior, CO (US)

(73) Assignee: Altera Corporation, San Jose, CA (US)

(*) Notice: Subject to any disclaimer, the term of this patent is extended or adjusted under 35 U.S.C. 154(b) by 45 days.

(21) Appl. No.: 10/098,805

(22) Filed: Mar. 13, 2002

(65) Prior Publication Data

US 2003/0174941 A1 Sep. 18, 2003

(51) Int. Cl.
*G02B 6/26* (2006.01)
*G02B 6/35* (2006.01)

(52) U.S. Cl. .................. 385/31; 385/47; 385/18

(58) Field of Classification Search ........... 385/16–24, 385/140, 36, 37; 359/836
See application file for complete search history.

(56) References Cited

U.S. PATENT DOCUMENTS

| | | | | |
|---|---|---|---|---|
| 3,875,353 A | * | 4/1975 | Mardach | 200/8 A |
| 4,100,532 A | * | 7/1978 | Farnbach | 382/106 |
| 4,232,207 A | * | 11/1980 | Kuhl et al. | 200/11 R |
| 4,589,726 A | * | 5/1986 | Buhrer | 385/21 |
| 5,073,040 A | * | 12/1991 | Guinard | 385/26 |
| 5,105,403 A | * | 4/1992 | Kando et al. | 369/44.12 |
| 5,212,582 A | | 5/1993 | Nelson | |
| 5,414,540 A | | 5/1995 | Patel et al. | |
| 5,600,383 A | | 2/1997 | Hornbeck | |
| 5,917,625 A | | 6/1999 | Ogusu et al. | |
| 5,960,133 A | * | 9/1999 | Tomlinson | 385/18 |
| 5,999,672 A | | 12/1999 | Hunter et al. | |
| 6,028,689 A | | 2/2000 | Michalicek et al. | |
| 6,031,946 A | * | 2/2000 | Bergmann et al. | 385/18 |
| 6,040,935 A | | 3/2000 | Michalicek | |
| 6,097,519 A | | 8/2000 | Ford et al. | |
| 6,097,859 A | | 8/2000 | Solgaard et al. | |
| 6,108,471 A | | 8/2000 | Zhang et al. | |

(Continued)

FOREIGN PATENT DOCUMENTS

JP 54092758 A * 7/1979

OTHER PUBLICATIONS

Ford, Joseph E., et al., "Wavelength Add-Drop Switching Using Tilting Micromirrors," Journal of Lightwave Technology, vol. 17, No. 5, pp. 904-911, May 1999.

(Continued)

*Primary Examiner*—Sarah Song
(74) *Attorney, Agent, or Firm*—Townsend and Townsend and Crew LLP

(57) ABSTRACT

Retroreflecting elements adapted for use in two-by-two optical routing elements. Each retroreflecting element is configured to selectively retroreflect two optical rays. A first reflective surface, such as may be provided by a mirror, is inclined with respect to a reference plane. A second reflective surface, such as may also be provided by a mirror, is opposed to and inclined with respect to the first reflective surface. The two surfaces are configured for rotation about an axis to multiple positions such that in a first position, a first ray is retroreflected along a first path and second ray is reflected along a second path, and in a second position, the first ray is reflected along the second path and the second ray is reflected along the first path.

18 Claims, 7 Drawing Sheets

U.S. PATENT DOCUMENTS

| | | | |
|---|---|---|---|
| 6,128,122 | A | 10/2000 | Drake et al. |
| 6,307,657 | B1 | 10/2001 | Ford |
| 6,312,114 | B1 * | 11/2001 | Silverbrook ................. 347/85 |
| 6,329,738 | B1 * | 12/2001 | Hung et al. ................. 310/309 |
| 6,407,872 | B1 * | 6/2002 | Lai et al. .................... 359/833 |
| 6,443,061 | B1 * | 9/2002 | Suzuki ....................... 101/228 |
| 6,501,877 | B1 | 12/2002 | Weverka et al. |
| 6,583,415 | B2 * | 6/2003 | Stevens ...................... 250/330 |
| 2002/0197002 | A1 * | 12/2002 | Lin ............................. 385/18 |

OTHER PUBLICATIONS

Grade, John D., et al., "A Large-Deflection Electrostatic Actuator for Optical Switching Applications," Solid State Sensor and Actuator Workshop, Hilton Head Island, S.C., pp. 97-100, Jun. 4-8, 2000.

Dewa, Andrew S., et al., "Development of a Silicon Two-Axis Micromirror for an Optical Cross-Connect," Solid-State Sensor and Actuator Workshop, Hilton Head, SC, Jun. 4-8, 2000.

Nishi, I., et al., "Broad-Passband-Width Optical Filter for Multi/Demultiplexer Using a Diffraction Grating and a Retroreflector Prism," Electronics Letters, vol. 21, No. 10, pp. 423-424, May 9, 1985.

Philippe, P., et al., "Wavelength demultiplexer: using echelette gratings on silicon substrate," Applied Optics, vol. 24, No. 7, pp. 1006-1011, Apr. 1, 1985.

Rallison, R.D., et al., "Dense Wavelength Division Multiplexing (DWDM) and the Dickson Grating," White Paper, Jan. 6, 2001.

Sun, Z.J., et al., "Demultiplexer with 120 Channels and 0.29-nm Channel Spacing," IEEE Photonics Technology Letters, vol. 10, No. 1, pp. 90-92, Jan. 1998.

Tang, William C., et al., "Electrostatically Balanced Comb Drive for Controlled Levitation," Technical Digest IEEE Solid-State Sensor and Actuator Workshop, pp. 23-27, Jun. 1990.

* cited by examiner

TWO-BY-TWO OPTICAL ROUTING ELEMENT USING TWO-POSITION MEMS MIRRORS

CROSS REFERENCES TO RELATED APPLICATIONS

This application is related to commonly assigned, concurrently filed U.S. patent application Ser. No. 10/099,392, entitled "ONE-TO-M WAVELENGTH ROUTING ELEMENT" by Nicholas Charles Cizek et al., the entire disclosure of which is herein incorporated by reference for all purposes.

BACKGROUND OF THE INVENTION

This application relates generally to fiber-optic communications. This application relates more specifically to techniques and devices for routing different spectral bands of an optical beam.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However, SONET/SDH systems are designed to process only a single optical channel. Multi-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTNs). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADMs) and wavelength-selective cross-connects (WSXCs).

In various optical-networking applications in optical networks, there is a general need for a two-by-two optical switch that operates on an individual wavelength basis. For example, such two-by-two optical switches may be used as building blocks in larger cross-connect architectures. Specific examples of such larger cross-connect architectures are provided in copending, commonly assigned U.S. patent application Ser. No. 10/093,844, entitled "OPTICAL CROSS CONNECT ARCHITECTURES USING WAVELENGTH ROUTING ELEMENTS," by Edward J. Bortolini et al., the entire disclosure of which is herein incorporated by reference for all purposes

BRIEF SUMMARY OF THE INVENTION

The present invention provides a wavelength router that allows flexible and effective routing of spectral bands between a pair of input ports and a pair of output ports.

An embodiment of the invention includes a device for selectively retroreflecting two input rays. The device includes a first reflective surface inclined with respect to a plane and a second reflective surface opposed to the first surface, thereby forming an included angle $\alpha$. The two surfaces are configured for rotation together about an axis to a plurality of positions, including at least a first position and a second position. The surfaces are disposed such that when the surfaces are in the first position, a first ray is retroreflected along a first path, and when the surfaces are in the second position, the first ray is retroreflected along a second path.

The surfaces may be further disposed such that when the surfaces are in the first position, a second ray is retroreflected along the second path, and when the surfaces are in the second position, the second ray is retroreflected along the first path. The first and second surfaces may be formed on a common mass. The angle $\alpha$ may be substantially equal to 90°. One or both of the reflective surfaces may have optical power. The paths may be parallel. At least one of the paths may be parallel to the axis.

The device may have a circular projection on the plane. The axis may be substantially perpendicular to the plane. The surfaces may be configured for rotation to at least a third position wherein at least one of the rays is retroreflected along a path not coincident with either the first or second paths. The plurality of positions may comprise a continuum of positions. The second position may be chosen for selective attenuation of the first ray. The plurality of position may comprises a plurality of discrete positions.

In other embodiments, a two-by-two optical routing element for receiving, at each of a pair of input ports, light having a plurality of spectral bands, and directing selected ones of the spectral bands to either of two output ports includes a free-space optical train disposed between the input ports and the output ports providing optical paths for routing the spectral bands. The optical train has a dispersive element disposed to intercept the light traveling from the input port. The routing element also includes a routing mechanism having a plurality of dynamically configurable retroreflecting elements, each such dynamically configurable retroreflecting element includes a first reflective surface inclined with respect to an axis and a second reflective surface opposed to the first surface, thereby forming an included angle $\alpha$. The two surfaces are configured for rotation together about the axis to a plurality of positions including at least a first position and a second position.

In other embodiments, a method for directing optical rays includes reflecting a first optical ray from a first reflective surface inclined with respect to an axis and thereafter reflecting the first optical ray from a second reflective surface along a first optical path. The second reflective surface is opposed to the first surface thereby forming an included angle $\alpha$. The two surfaces are configured for rotation together about the axis to a plurality of position. The method also includes reflecting a second optical ray from the second reflective surface and thereafter reflecting the second optical ray from the first reflective surface along a second optical path.

The method may include rotating the surfaces to a position such that the first ray is reflected along the second path and the second ray is reflected along the first path. The surfaces may be formed on a common mass. The angle α may be substantially equal to 90°. The position may be chosen for selective attenuation of at least one of the rays.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

DETAILED DESCRIPTION OF THE INVENTION

1. Introduction

Figure 1A:
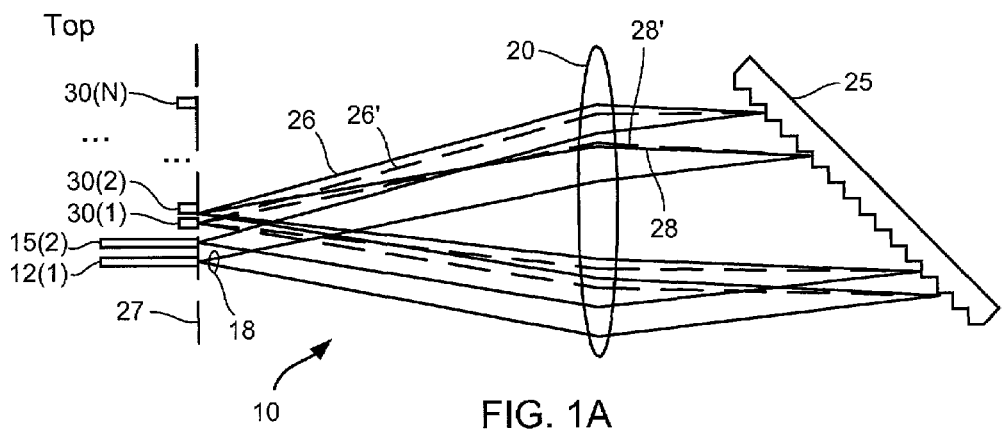
FIGS. 1A, 1B, and 1C are schematic top, side, and end views, respectively, of an optical routing element according to a first embodiment of the invention.

The following description sets forth embodiments of an optical routing element according to the invention. The general functionality of the optical routing element is to accept two optical signals, each having a plurality of (say N) spectral bands at a pair of input ports, and to direct the spectral bands according to their individual wavelengths to either of a pair of output ports. Embodiments generally include a free-space optical train to provide optical paths for the spectral bands and a routing mechanism that includes a plurality of dynamically configurable retroreflecting elements arranged to route the individual spectral bands as desired. As used herein, a "retroreflecting element" causes an incident optical ray to be directed along a path having a projection on the path of the incident ray that is opposite in direction to the incident path. In a special case, the redirected and incident paths are parallel but opposite in direction.

The term "free space" refers to the fact that light within the body of the optical routing element is not confined in the dimensions transverse to propagation, but can be regarded as diffracting in these transverse dimensions. Free-space optical trains may include airspace embodiments or embodiments in which the various beams are all within a body, such as of glass, examples of both of which are provided below. In some embodiments, the free-space optical train may be the same or similar to embodiments of free-space optical trains described in connection with copending, commonly assigned U.S. patent application Ser. No. 09/442,061 entitled "WAVELENGTH ROUTER," filed Nov. 16, 1999 by Robert T. Weverka et al., the entire disclosure of which, including the Appendix, is herein incorporated by reference for all purposes.

Embodiments of the invention include a dispersive element, such as a diffraction grating or a prism, which operates to deflect incoming light by a wavelength-dependent amount. Different portions of the deflected light are intercepted by different dynamically configurable retroreflecting elements. Although the incoming light could have a continuous spectrum, adjacent segments of which could be considered different spectral bands, it is generally contemplated that the spectrum of the incoming light will have a plurality of spaced bands.

The terms "input port" and "output port" are intended to have broad meanings. At the broadest, a port is defined by a point where light enters or leaves the system. For example, the input (or output) port could be the location of a light source (or detector) or the location of the downstream end of an input fiber (or the upstream end of an output fiber). In specific embodiments, the structure at the port location could include a fiber connector to receive the fiber, or could include the end of a fiber pigtail, the other end of which is connected to outside components. Most of the embodiments contemplate that light will diverge as it enters the wavelength router after passing through the input port, and will be converging within the wavelength router as it approaches the output port. However, this is not necessary.

The International Telecommunications Union (ITU) has defined a standard wavelength grid having a frequency band centered at 193,100 GHz, and another band at every 100 GHz interval around 193,100 GHz. This corresponds to a wavelength spacing of approximately 0.8 nm around a center wavelength of approximately 1550 nm, it being understood that the grid is uniform in frequency and only approximately uniform in wavelength. Embodiments of the invention are preferably designed for the ITU grid, but finer frequency intervals of 25 GHz and 50 GHz (corresponding to wavelength spacings of approximately 0.2 nm and 0.4 nm) are also of interest.

2. Optical Routing Element

Embodiments of the invention include various structures for the optical routing element, each of which may adopt principles described below for the dynamically configurable retroreflecting elements. Some such embodiments are described below although it will be understood that the dynamically configurable retroreflecting elements may be included in other optical routing element designs without exceeding the spirit and scope of the invention. Such designs may generally include single-pass, double-pass, and four-pass routing elements.

Figure 1B:
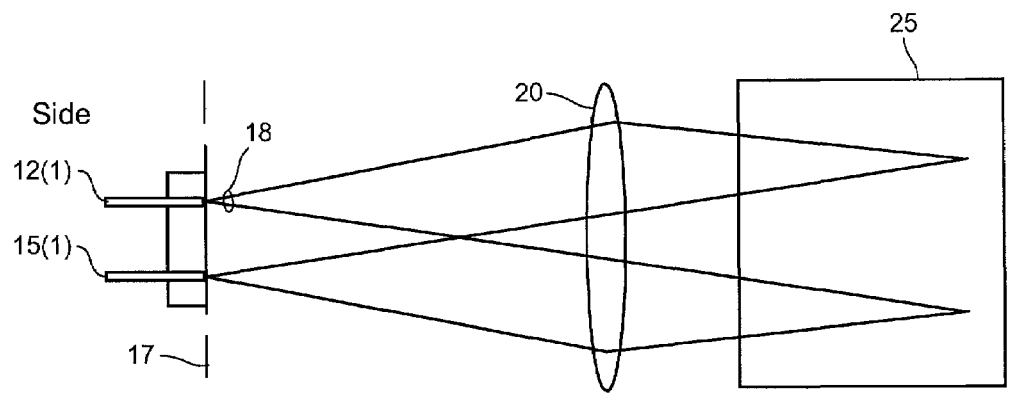
Figure 1C:
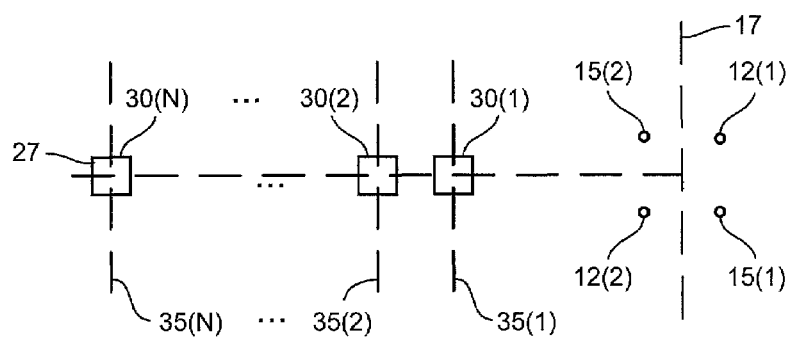

FIGS. 1A, 1B, and 1C are schematic top, side, and end views, respectively, of a optical routing element 10 according to one embodiment of the invention. The general functionality of the optical routing element 10 is to accept two optical signals, each having a plurality of (say N) spectral bands at a pair of input ports 12, and selectively to direct individual spectral bands to either of two output ports. As shown in end view of FIG. 1C, the input ports 12 and output ports 15 are generally coplanar in a plane defined by lines 17 and 27, which respectively extend generally perpendicular to the top and side views of FIGS. 1A and 1B. In one embodiment, the output ports 15 are positioned within the plane substantially equidistantly from the input ports 12, the four ports generally defining a square having the output ports at opposite corners from each other and the input ports at opposite corners from each other. In the top and side views of FIGS. 1A and 1B, the input and output ports are shown as communicating with respective input and output optical fibers, but it should be understood that the input ports could also receive light directly from a light source, and the output ports could be coupled directly to optical detectors.

Light entering the optical routing element 10 from each of the input ports 12 forms a diverging beam, only one of which beams is shown, the beam 18 entering via the input port 12(1). The beam 18 includes the different spectral bands. The beam 18 encounters a lens 20, which collimates the light and directs it to a reflective diffraction grating 25. The grating 25 disperses the light so that collimated beams at different wavelengths are directed at different angles back towards the lens 20. Two such collimated beams at different wavelengths are shown explicitly and denoted 28 and 28', the latter drawn in dashed lines. Since these collimated beams encounter the lens at different angles, they are focused at different points along line 27 in a transverse focal plane. Line 27 extends in the plane of the top view of FIG. 1A.

The focused beams 28 and 28' encounter respective ones of a plurality of dynamically configurable retroreflecting elements 30 (1, . . . , N), located near the focal plane. The retroreflecting elements 30 act as described below to redirect the spectral bands as diverging beams back towards the lens 20, the specific direction of each spectral band depending on the configuration of the corresponding retroreflecting element 30. The configuration of the corresponding retroreflecting element 30 may also be chosen in certain embodiments to achieve selected attenuation of the spectral band. The beams 26 and 26' returning from the retroreflecting elements 30 are collimated by the lens 20 and directed again to the grating 25. The grating 25 removes the angular separation between different beams for which the corresponding retroreflecting elements 30 were similarly configured on its second encounter, and directs the collimated beams back to the lens 20, which focuses them. Depending on the configurations of the retroreflecting elements 30, different beams may be focused to different output ports 15. In the example illustrated, the beam shown is focused to the output port 15(2). (In FIG. 1B, only the beam path from the input port 12(1) to the retroreflecting element 30(1) is illustrated, as the path of the beam from the retroreflecting element 30(1) to the output port 15(2) lies nearly directly behind it).

Figure 2A:
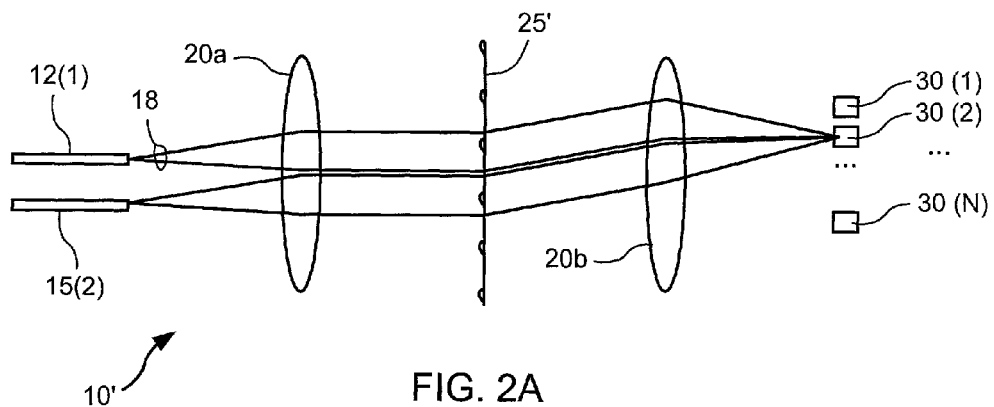
FIGS. 2A and 2B are schematic top and side views, respectively, of an optical routing element according to a second embodiment of the invention.
Figure 2B:
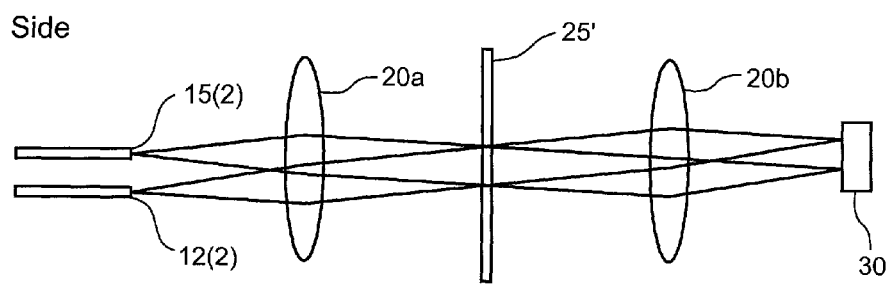

FIGS. 2A and 2B illustrate another embodiment for a two-by-two optical routing element 10' that differs from the embodiment of FIGS. 1A–1C in that it uses a transmissive diffraction grating 25' and a pair of lenses 20a and 20b. Light entering the optical routing element 10' from each of the input ports 12 forms a diverging beam, which includes the different spectral bands. Again, only one such beam is shown and designated by reference numeral 18. The beam 18 encounters the first lens 20a, which collimates the light and directs it to the grating 25'. The grating 25' disperses the light so that collimated beams at different wavelengths emerge from the beam and proceed. The collimated beams, one of which is shown, encounter the second lens 20b, which focuses the beams. The focused beams encounter respective ones of a plurality of dynamically configurable retroreflection elements 30 to retroreflect attenuated beams back to lens 20b, where they are collimated and directed to the grating 25'. On the second encounter, the grating 25' removes the angular separation between different beams, which are then focused onto respective output ports 15 depending on the configuration of the retroreflecting elements 30.

The embodiment shown in FIGS. 2A and 2B may be considered an unfolded version of the embodiment shown in FIGS. 1A–1C. In a specific implementation, the input ports, lens 20a, grating 25', lens 20b, and retroreflecting elements 30 are spaced at approximately equal intervals, with the two lenses having equal focal lengths and the distance between the input port 12 and the retroreflecting elements 30 being four times the focal length. Thus, the focal lengths and the relative positions define what is referred to as a "4f relay" between the input port 12 and the retroreflecting elements 30, and also a 4f relay between the retroreflecting elements 30 and the output port(s) 15. The optical system may be telecentric.

Figure 3:
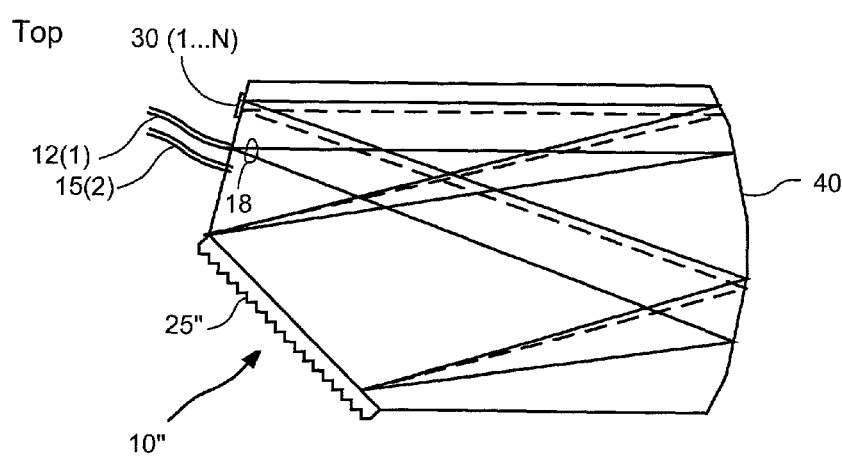
FIG. 3 is a schematic top view of an optical routing element according to a third embodiment of the invention.

FIG. 3 is a schematic top view of another embodiment of a optical routing element 10" that may be considered to be a further folded version the embodiment of FIGS. 1A–1C. This embodiment is a solid-glass embodiment that uses a concave reflector 40 in place of the lens 20 of the embodiment shown in FIGS. 1A–1C, or in place of lenses 20a and 20b of the embodiment shown in FIGS. 2A and 2B. As for the other embodiments, light entering the optical routing element 10" from each input port 12 forms a diverging beam (one shown as 18) that includes the different spectral bands. The beam is collimated by the concave reflector 40, which directs it to the reflective diffraction grating 25". The grating 25" disperses the light so that collimated beams at different wavelengths are directed at different angles back towards the reflector 40. Two such beams are shown explicitly, one in solid lines and one in dashed lines. Since these collimated beams encounter the reflector 40 at different angles, they are focused at different points in a transverse focal plane.

The focused beams encounter retroreflecting elements 30 located near the focal plane. The operation in the reverse direction is as described in connection with the embodiments above, and the beams follow the reverse path, which, for clarity, are not shown in FIG. 3. On this return path, the beams encounter the concave reflector 40, the reflective grating 25", and the concave reflector 40, the final encounter with which focuses the beams to the desired output ports 15.

3. Retroreflector Structures

Figure 4A:
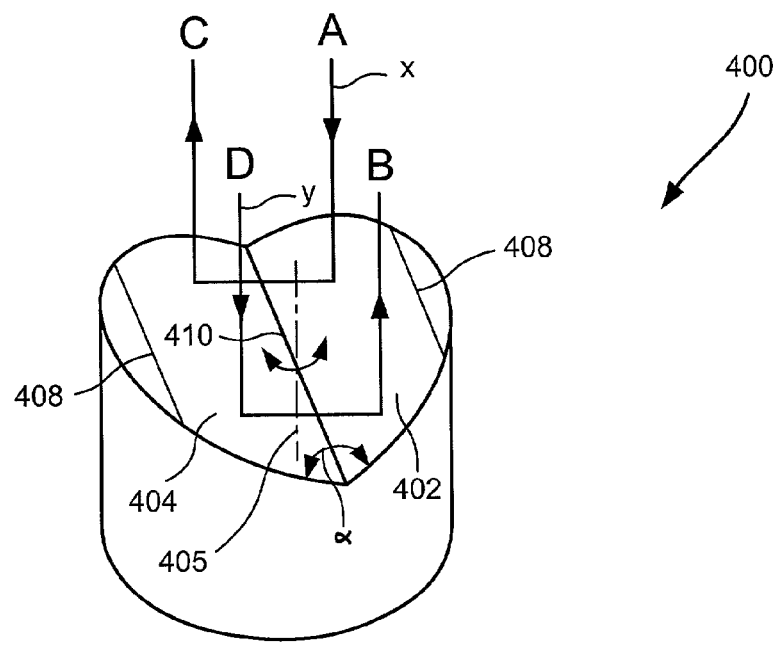
FIGS. 4A and 4B are first and second perspective views of a dynamically configurable retroreflecting element according to an embodiment of the invention.

Each of the N dynamically configurable retroreflecting elements 30 in any of the embodiments described above, or in other optical routing element structures using different optical-train configurations, may be configured in different ways according to different embodiments of the invention. In one embodiment, illustrated in perspective view in FIGS. 4A and 4B, the dynamically configurable retroreflecting element 400 includes first and second reflective surfaces 402 and 404. The retroreflecting element 400 is configured to retroreflect a pair of optical rays, ray X and ray Y, whose directions are generally orthogonal to a reference plane. In partial furtherance of this end, the two reflective surfaces 402 and 404 are angled with respect to each other to reflect an incoming ray from an input port toward the other reflective surface. The retroreflecting element 400 is configured for rotation about an axis 405 to a plurality of positions such that the optical rays X and Y are retroreflected along any of a plurality of optical paths, two of which are "ON" paths relating to a first ON position and a second ON position. FIG. 4A illustrates the first ON position, FIG. 4B the second. OFF positions will be further described below.

Figure 4B:
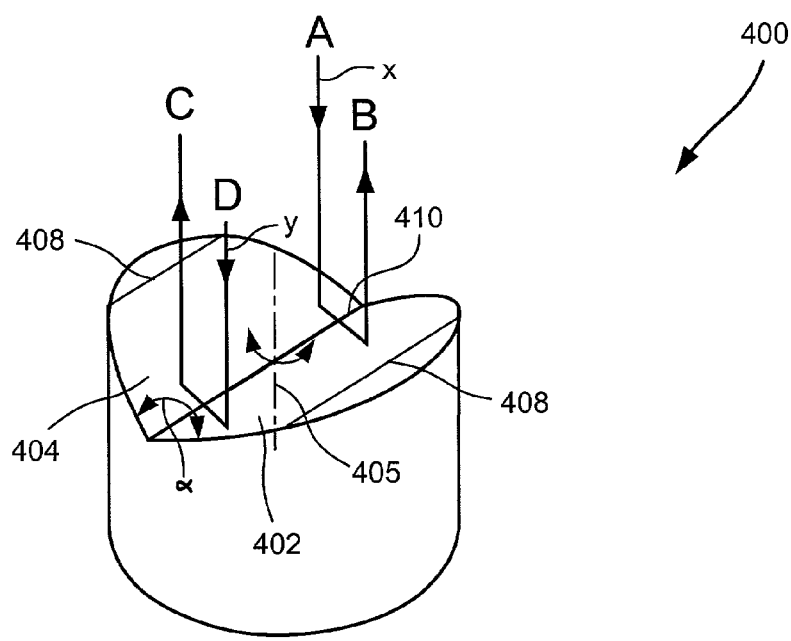

In either of the ON positions for the retroreflecting element 400, the first reflective surface 402 is disposed to encounter one of either ray X or ray Y, while the second reflective surface 404 is disposed to encounter the other of ray X or ray Y. The angle of intersection α of the first reflective surface 402 with the second reflective surface 404 is chosen such that when the retroreflecting element 400 is in either of the two ON positions, the incoming ray is reflected along a path leading to an output port upon being reflected the second time. Thus, the retroreflecting element 400 is configured to reflect either of two rays X and Y, inbound from either of two input ports A and D, along paths to either of two output ports B and C. FIGS. 4A and 4B also include reference lines 408 that are included for notational purposes only, to demonstrate how the lines are used in other figures to indicate the position of the surfaces and the portion of each surface that is further from a reference plane located at the base of the retroreflecting element 400. The reference lines 408 are not included on the actual surfaces and are used solely for notational purposes.

Although FIGS. 4A and 4B appear to illustrate that the reflective surfaces 402 and 404 intersect, this is not required, even though the planes defined by the surfaces intersect. It also is not necessary that the reflective surfaces 402 and 404 are symmetric with respect to the axis of rotation 405. Further, in some embodiments, the axis of rotation 405 may be located at a point along the line 410 common to the planes defined by the two reflective surfaces 402 and 404 as illustrated. However, this is not required. In some embodiments, the axis of rotation 405 may intersect each plane at a different point. Each may be inclined at a different angle to the axis of rotation 405. Further still, the reflective surfaces 402 and 404 may be designed with optical power to focus a ray at a particular point. Additionally, although the retroreflecting element 400 is illustrated as having a circular projection on the reference plane, this is not a requirement. The retroreflecting element 400 may also be square-shaped, or any other appropriate shape In light of the disclosure herein, it is apparent to those skilled in the art that it is also possible to configure retroreflecting element 400 such that only one of rays X and Y at a time is reflected to an output port, Such arrangements would be useful, for instance, in ADMs wherein it may be desired to drop certain wavelengths from the output channels. This would create the possibility of having additional ON positions for the retroreflecting element 400, such as, for example: a first position, wherein any from input port A is reflected toward output port B and a ray from input port D is not reflected to an output port; a second position, wherein a ray from input port A is reflected toward output part C and a ray from input port D is not reflected to an output port; a third position, wherein a ray from input port D is reflected toward output port B and a ray from input port A is not reflected to an output port; and a fourth position, wherein a ray from input port D is reflected toward output port C and a ray from input port A is not reflected to an output port. Other combinations and permutations are also possible.

Figure 5A:
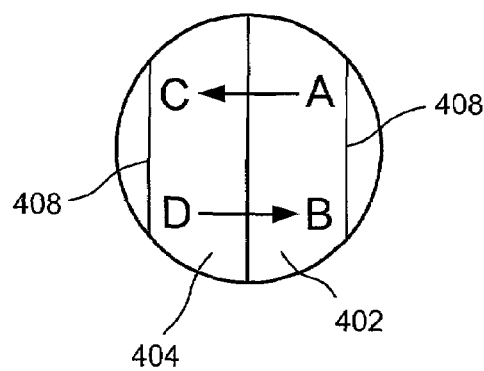
FIGS. 5A and 5B are schematic illustrations of switching positions and functions that may be achieved with the dynamically configurable retroreflecting element shown in FIGS. 4A and 4B.
Figure 5A:
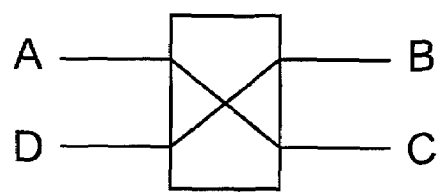
Figure 5B:
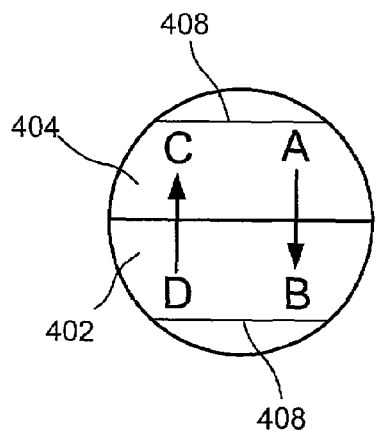
Figure 5B:
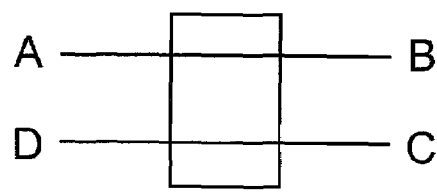

FIGS. 5A and 5B illustrate the retroreflecting element 400 in two different ON positions. The top portions of FIGS. 5A and 5B are top views of the retroreflecting element 400 in each of the two ON positions. The bottom portions of FIGS. 5A and 5B are schematic representations of the function performed by the retroreflecting element 400 in the position indicated by the top view shown directly above. In FIG. 5A, an optical ray is reflected from input port A toward output port C, while a second optical ray is reflected from input port D to output port B. As can be visualized from the schematic representation, this position for the retroreflecting element 400 could be referred to as the "crossed" position. In FIG. 5B, an optical ray is reflected from input port A toward output port B, while a second optical ray is reflected from input port D toward output port C. As can be appreciated by reference to reference lines 408, in this position, element 400 is rotated 90° with respect to its position in the top portion of FIG. 5A. This position could be referred to as the "bar" position, as shown schematically in the lower image. Thus, the retroreflecting element 400 effectively serves the function of a 2-by-2 or "cross-bar" optical switch.

4. Rotation Mechanisms

In the retroreflector implementations discussed above, the retroreflector element 400 is configured for rotation about an axis to a plurality of positions. While the plurality of positions has been shown and discussed as a series of discrete positions, this is not a requirement. The plurality of positions could comprise a continuum of positions, most of which would result in no retroreflection of the incoming optical rays directly to output ports. Such OFF positions will be further explained herein below. Examples of mechanisms that may be used in any of the embodiments discussed above to position the retroreflecting element 400 are provided in FIGS. 6 and 7. For MEMS implementations of the retroreflector embodiments, such rotation mechanisms may be fabricated using standard MEMS techniques known to those skilled in the art.

Figure 6:
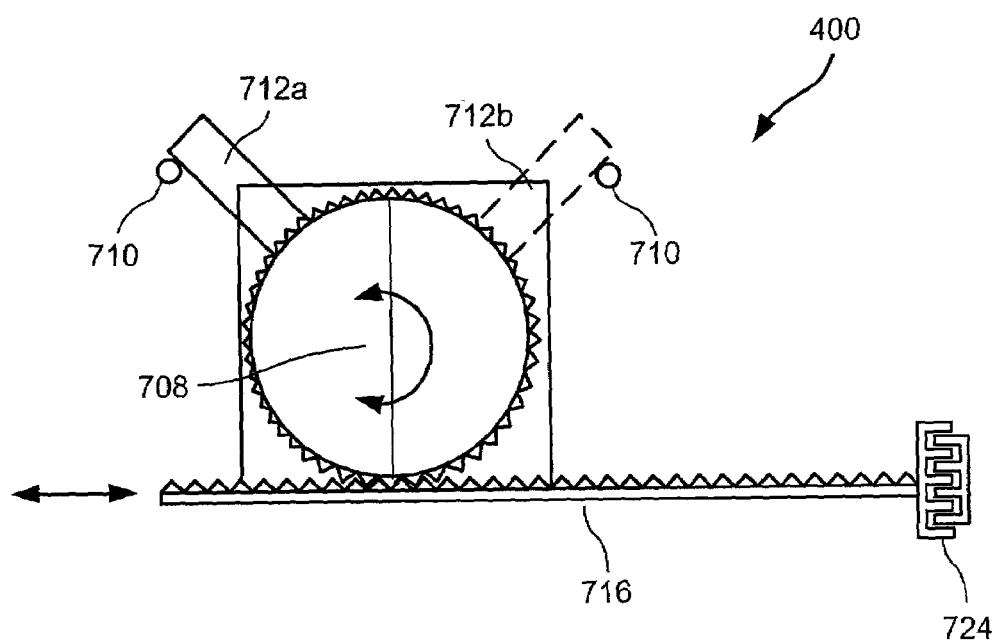
FIG. 6 is a schematic illustration of a first embodiment for achieving different switching positions for dynamically configurable retroreflecting elements.

FIG. 6 shows an embodiment providing a rotation mechanism that may achieve substantially a continuum of positions. For illustrative purposes, the rotation mechanism is shown for the retroreflector element embodiment of FIG. 4A, and thus FIG. 6 may be considered to be a bottom view of the structure of FIG. 4A. A comb actuator 724 is configured to provide translational motion to a connecting member 716 that is configured for engagement with a gear 708. The gear 708 is affixed to the retroreflecting element 400 and may be rotated to a desired position by appropriate actuation of the comb actuator 724. In order to achieve more precise alignment at two positions, for example two ON positions, one or two stops 710 may be provided that cooperate with an arm 712 extending from the retroreflecting element 400. In one example, the stops 710 prevent rotation of the retroreflecting element 400 beyond a first position indicated by 712a in one direction, and a second position 712b (shown in phantom) in the opposite direction. The two positions indicated by 712a and 712b could be established as the two ON positions illustrated in FIGS. 5A and 5B, while any position between the two could be an OFF position.

Embodiments using a rotation mechanism that provides a continuum of positions permits the optical attenuation of each wavelength to be varied independently, as described in copending, commonly assigned Provisional U.S. patent application No. 60/363,724, entitled "VARIABLE WAVELENGTH ATTENUATOR FOR SPECTRAL GROOMING USING MICROMIRROR ROUTING," by Samuel Paul Weaver, the entire disclosure of which is herein incorporated by reference. As described therein, small changes in mirror position such as maybe achieved with a continuous rotation mechanism may be used to affect attenuation of a particular optical channel while still directing a portion of the light in that channel to the appropriate output port.

Figure 7:
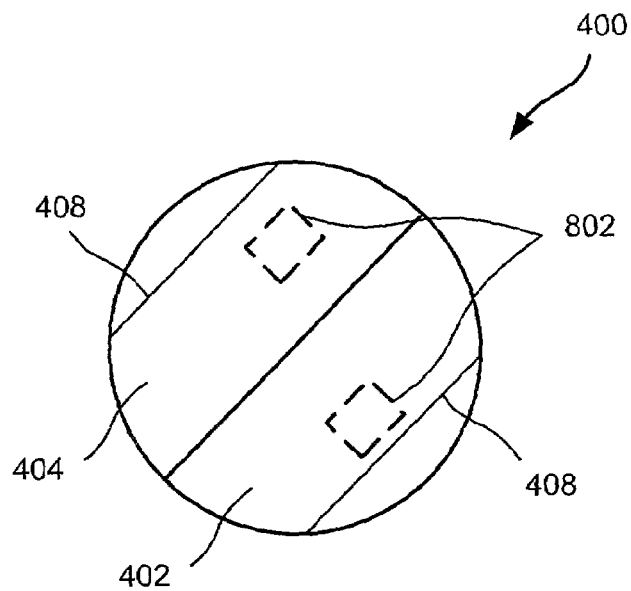
FIG. 7 is a schematic illustration of a second embodiment for achieving different switch positions for dynamically configurable retroreflecting elements.

FIG. 7 shows an embodiment providing a rotation mechanism that may achieve a discrete number of positions. For illustrative purposes, the mechanism is again shown for the retroreflector element embodiment of FIG. 4A, and thus FIG. 7 may be considered to be a top view of the structure of FIG. 4A. At discrete positions around the retroreflecting element 400, electrodes 802 are positioned on a surface orthogonal to the axis of rotation at a plurality of positions used to define the discrete positions of the retroreflecting element 400. The underside of the retroreflecting element 400 includes a metallic portion that is electrostatically attracted to one of the plurality of electrodes when that electrode is activated. Rotation of the retroreflecting element 400 from one of the discrete positions to another includes activating the electrode 802 that defines the desired new position (and deactivating the electrode 802 that defines the existing electrode position if it has not previously been deactivated). The resulting change in electrostatic attraction felt by the metal portion causes the retroreflecting element 400 to move to that position.

While specific mechanisms have been described to achieve both a continuum of positions or a discrete number of positions for the retroreflecting element, alternative mechanisms may also be used without departing from the spirit of the invention. Also, while a specific example of each type of rotation mechanism has been described with reference to the embodiment of FIG. 4A, it will be understood that each of the mechanisms described may be applied to any of the retroreflector embodiments discussed herein.

5. Optical Routing Elements With OFF Positions

In some applications, it is desirable for optical routing elements, such as those described with respect to FIGS. 1A–3, to include OFF positions in which one or more individual spectral bands are not directed to any active output ports. Such applications may be accommodated in accordance with embodiments of the invention by including one or more inactive positions for the retroreflector. An example of a configuration that accommodates such OFF positions is illustrated in FIG. 8.

Figure 8:
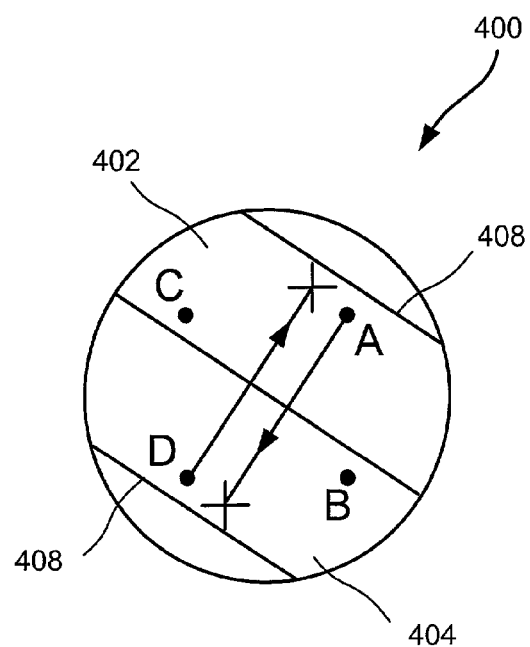
FIG. 8 illustrates an embodiment of a dynamically configurable retroreflecting element that includes an OFF position.

FIG. 8 provides a top view of the retroreflector element 400 similar to the embodiment shown in FIG. 4A. In FIG. 8, the retroreflector element 400 is positioned such that neither of the input rays from the input ports A and D is reflected toward an output port. This is the case because the retroreflector element 400 is rotated from one of the ON positions, and the angle of reflection places the input rays on paths that do not encounter the output ports. Other examples are possible, as explained above, wherein one input ray may be ON while the other input ray is OFF.

6. Optical Port Arrangements

To accommodate different embodiments of the invention, optical ports may be configured in different ways on a optical routing element. In embodiments where the optical port is at the end of an optical fiber, the optical fibers may be configured in different ways also. In one embodiment, the optical port assembly, which includes both input and output ports, comprises a rectangular prism made of a material such as silicon. Optical fibers may be connected with the prism so that the ports are at the ends of the output fibers. Each such optical fiber generally includes a core and a cladding layer. The core is the inner part of the fiber through which light is guided. It is surrounded completely by the cladding layer, which has a lower refractive index so that a light ray in the core that strikes the core/cladding boundary at a glancing angle is confined within the core by total internal reflection. An example of the prism structure is shown in FIG. 9, which illustrates a possible port configuration for a optical routing element with two input ports and two output ports.

Figure 9:
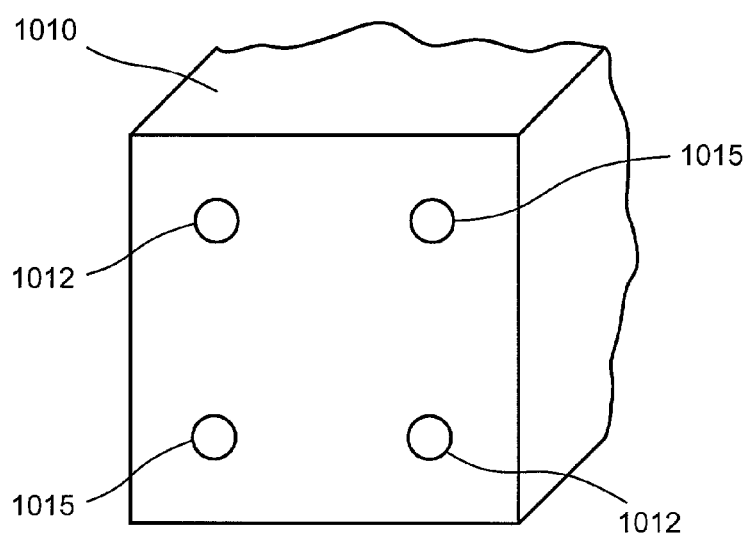
FIG. 9 illustrates one possible port configuration that can be used with embodiments of the invention.

The port arrangement shown in FIG. 9 is a silicon prism 1010 that includes an arrangement with the two output ports 1015 located at opposite vertices of a rectangle and the two input ports 1012 at the remaining vertices. This arrangement is suitable, for example, for the retroreflector implementation shown in FIG. 4.

Figure 10A:
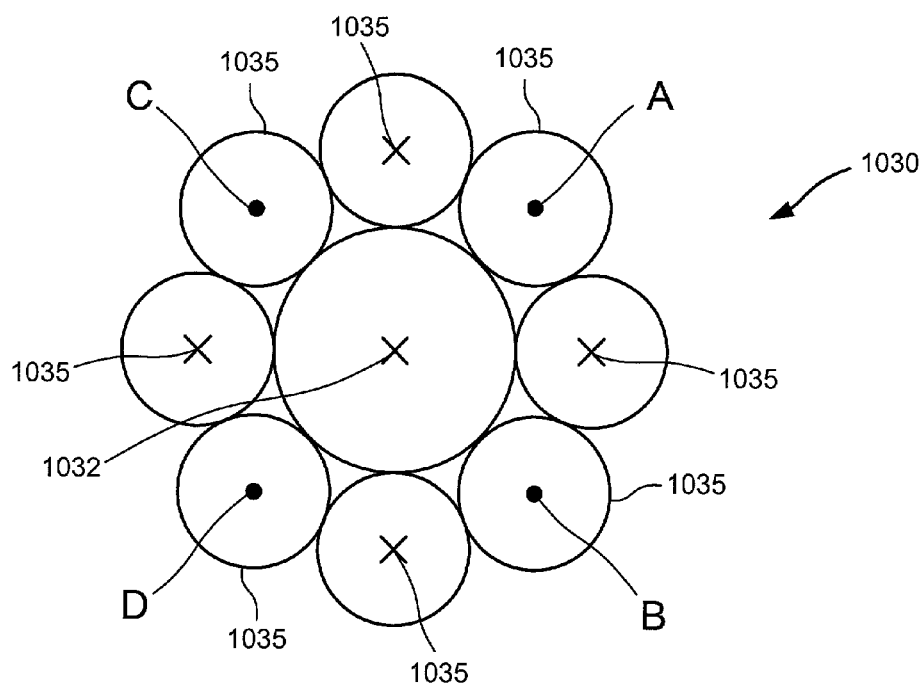
FIGS. 10A, 10B and 10C illustrate end views of possible fiber arrangements that can be used with embodiments of the invention.
Figure 10B:
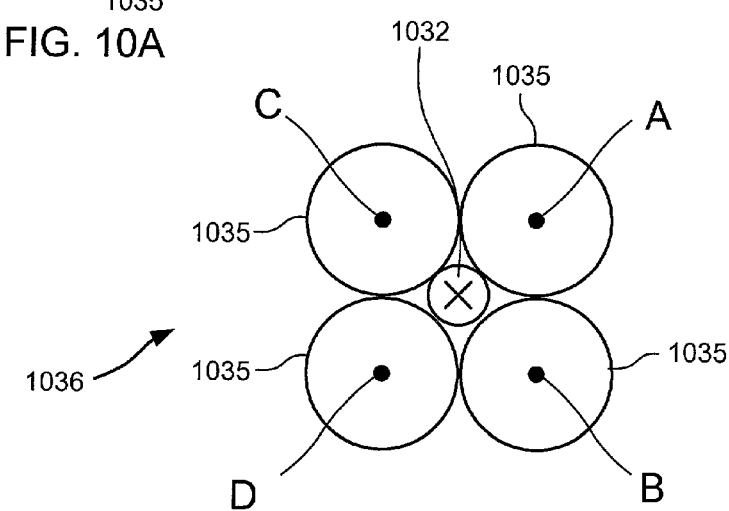
Figure 10C:
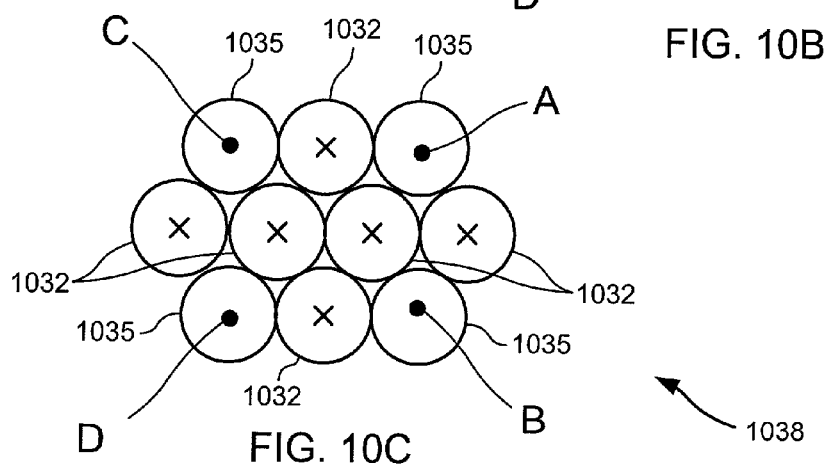

Alternatively, to provide optical ports at the end of optical fibers in such orientations, the fibers may be bundled together with spacers of specific diameter as needed. Such an arrangements are shown in FIGS. 10A–10C. An arrangement 1030, shown in FIG. 10A, is suitable for the retroreflector embodiments described herein. The spacing between individual ports is controlled by the respective diameters of the fibers and spacers. The fibers will generally have standard diameters determined by the size of the core and cladding layers. The desired diameters may be achieved through removal of a portion of the cladding layer where a smaller diameter is desired and through coating of the cladding layer where a larger diameter is desired.

In the arrangement 1030, shown in an end view in FIG. 10A, a fiber arrangement for a two-by-two optical routing element is provided by bundling nine fibers together, with a spacer fiber 1032 being surrounded by eight fibers 1035, two of which, A and D, are input fibers, and two of which, B and C, are output fibers, according to their tightest packing. By squeezing the fibers together uniformly, the core-to-core spacings are equal to twice the diameter of a single fiber, as shown. Embodiments that use at least one spacer have the advantage that the spacer may be used as a straightness reference during binding, thereby simplifying alignment of the fibers.

FIG. 10B illustrates a second arrangement 1036 using five fibers. A spacer fiber 1032 is surrounded by four fibers 1035, two of which, A and D, are input fibers, and two of which, B and C, are output fibers. FIG. 10C illustrates a third arrangement 1038 using 10 equally sized fibers.

7. Macroscopic Retroreflecting Elements

In the embodiments described above, the retroreflecting elements are described as elements configured for retroreflection of two different rays within either one or two spectral bands within an optical routing element. Such elements are typically provided as microscopic MEMS devices fabricated using MEMS techniques known to those of skill in the art. Within the optical routing element, as many retroreflection elements are provided as are necessary to accommodate the spectral bands that may require routing.

It is noted, however, that similar structures to those described above may alternatively be provided in accordance with other embodiments in a macroscopic form. Such macroscopic embodiments may use graded-index ("GRIN") lenses to collimate light from an input fiber and larger macroscopic MEMS arrays to route the beams. Such an arrangement will generally be less costly than the microscopic arrangement by reducing requirements for precision, and is suitable for applications in which the routing is to be performed on all spectral bands of a beam.

Having described several embodiments, it will be recognized by those of skill in the art that various modifications, alternative constructions, and equivalents may be used without departing from the spirit of the invention. For example, while embodiments have illustrated the use of a grating as a dispersion element, alternative embodiments may use a prism for the same function. Accordingly, the above description should not be taken as limiting the scope of the invention, which is defined in the following claims.

What is claimed is:

1. A two-by-two optical routing element for receiving, at each of a pair of input ports, light having a plurality of spectral bands, and directing selected ones of the spectral bands to either of two output ports, the two-by-two optical routing element, comprising:
   a free-space optical train disposed between the input ports and the output ports providing optical paths for routing the spectral bands, the optical train having a dispersive element disposed to intercept the light traveling from the input port; and
   a routing mechanism having a plurality of dynamically configurable retroreflecting elements, each such dynamically configurable retroreflecting element including:
      a first reflective surface inclined with respect to an axis; and
      a second reflective surface opposed to the first surface, thereby forming an included angle $\alpha$;
   wherein the first reflective surface and the second reflective surface are configured for rotation together about the axis to a plurality of positions including at least a first position, a second position, and a third position;
   wherein the surfaces are disposed such that when the surfaces are in the first position, a first ray is retroreflected along a first path, thereby directing a first spectral band toward a first one of the output ports, and when the surfaces are in the second position, the first ray is retroreflected along a second path, thereby directing the first spectral band toward a second one of the output ports;
   wherein the surfaces are further disposed such that when the surfaces are in the first position, a second ray is retroreflected along the second path, thereby directing a second spectral band toward the second one of the output ports, and when the surfaces are in the second position, the second ray is retroreflected along the first path, thereby directing the second spectral band toward the first one of the output ports; and
   wherein the surfaces are further disposed such that when the surfaces are in the third position, the first spectral band and the second spectral band are directed away from an output port.

2. The two-by-two optical routing element recited in claim 1 wherein the surfaces are formed on a common mass.

3. The two-by-two optical routing element recited in claim 1 wherein $\alpha$ is substantially equal to 90°.

4. The two-by-two optical routing element recited in claim 1, wherein at least one of the reflective surfaces has optical power.

5. The two-by-two optical routing element recited in claim 1 wherein the paths are parallel.

6. The two-by-two optical routing element recited in claim 1 wherein at least one of the paths is parallel to the axis.

7. The two-by-two optical routing element recited in claim 1 wherein the routing mechanism has a circular projection a plane.

8. The two-by-two optical routing element recited in claim 1 wherein the plurality of positions comprises a continuum of positions.

9. The two-by-two optical routing element recited in claim 8 wherein the second position is chosen for selective attenuation of the first ray.

10. The two-by-two optical routing element recited in claim 1 wherein the plurality of positions comprises a plurality of discrete positions.

11. A method for directing optical rays, comprising:
   at an input port, receiving an input optical ray comprising a plurality of spectral bands;
   spectrally separating the input optical ray into spectral bands;
   reflecting a first optical ray from a first reflective surface inclined with respect to an axis, wherein the first optical ray comprises a first one of the spectral bands;
   thereafter reflecting the first optical ray from a second reflective surface along a first optical path toward a first output port, the second reflective surface being opposed to the first surface thereby forming an included angle $\alpha$, wherein the first reflective surface and the second reflective surface are configured for rotation together about the axis to a plurality of positions;
   reflecting a second optical ray from the second reflective surface, wherein the second optical ray comprises second one of the spectral bands;
   thereafter reflecting the second optical ray from the first reflective surface along a second optical path toward a second output port;
   rotating the surfaces to a position such that the first ray is reflected along the second path toward the second output port and the second ray is reflected along the first path toward the first output port; and
   rotating the surfaces to a third position wherein the first spectral band and the second spectral band are directed away from an output port.

12. The method recited in claim 11 wherein $\alpha$ is substantially equal to 90°.

13. The method recited in claim 11 wherein the position is chosen for selective attenuation of at least one of the rays.

14. The method recited in claim 11 wherein the plurality of positions comprises a continuum of positions.

15. The method recited in claim 11 wherein the plurality of positions comprises a plurality of discrete positions.

16. A micro-electro-mechanical system device for selectively retroreflecting two input rays, the device, comprising:
   first reflective means inclined with respect to a plane; and
   second reflective means opposed to the first reflective means, thereby forming an included angle $\alpha$;
   wherein the first and second reflective means are configured for rotation together about an axis to a plurality of positions, including at least a first position, a second position, and a third position;
   wherein the first and second reflective means are disposed such that when the first and second reflective means are in the first position, a first ray is retroreflected along a first path, thereby directing a first spectral band toward a first output port, and when the first and second reflective means are in the second position, the first ray is retroreflected along a second path, thereby directing the first spectral band toward a second output port;

wherein the first and second reflective means are further disposed such that when the first and second reflective means are in the first position, a second ray is retroreflected along the second path, thereby directing a second spectral band toward the second output port, and when the first and second reflective means are in the second position, the second ray is retroreflected along the first path, thereby directing the second spectral band toward the first output port;

wherein the first and second reflective means are further disposed such that when the surfaces are in the third position, the first spectral band and the second spectral band are directed away from an output port; and wherein the first and second reflective means comprise a micro-electro-mechanical system device.

17. The device recited in claim 16 wherein the first and second surfaces are formed on a common mass.

18. The device recited in claim 16 wherein $\alpha$ is substantially equal to 90°.

* * * * *

UNITED STATES PATENT AND TRADEMARK OFFICE
CERTIFICATE OF CORRECTION

PATENT NO. : 7,177,498 B2  
APPLICATION NO. : 10/098805  
DATED : February 13, 2007  
INVENTOR(S) : Nicholas Charles Cizek It is certified that error appears in the above-identified patent and that said Letters Patent is hereby corrected as shown below:

Column 5, line 18, delete "comers" and insert --corners--

Column 5, line 19, delete "comers" and insert --corners--

Column 7, line 61, delete "any" and insert --a ray--

Column 7, line 64, delete "part" and insert --port--

Column 9, lines 5-6, delete "mirrorposition" and insert --mirror position--

Column 9, line 6, delete "maybe" and insert --may be--

Signed and Sealed this

Fourteenth Day of August, 2007

JON W. DUDAS  
*Director of the United States Patent and Trademark Office*